United States Patent
Nam et al.

(10) Patent No.: US 7,487,424 B2
(45) Date of Patent: Feb. 3, 2009

(54) BITMAP MANAGER, METHOD OF ALLOCATING A BITMAP MEMORY, METHOD OF GENERATING AN ACKNOWLEDGEMENT BETWEEN NETWORK ENTITIES, AND NETWORK ENTITY IMPLEMENTING THE SAME

(75) Inventors: Kyung-Wan Nam, Gyeonggi-Do (KR); Kab-Joo Lee, Gyeonggi-Do (KR); Jae-Sun Choi, Gyeonggi-Do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 528 days.

(21) Appl. No.: 11/350,910

(22) Filed: Feb. 10, 2006

(65) Prior Publication Data

US 2006/0195753 A1    Aug. 31, 2006

(30) Foreign Application Priority Data

Feb. 15, 2005 (KR) .................. 10-2005-0012293

(51) Int. Cl.
*H04L 1/18* (2006.01)
(52) U.S. Cl. .................. 714/748; 714/763; 714/749
(58) Field of Classification Search ............... 345/545; 711/171, 156, 170, 117; 714/748, 749, 763
See application file for complete search history.

(56) References Cited

U.S. PATENT DOCUMENTS

| | | | | |
|---|---|---|---|---|
| 5,515,081 A | * | 5/1996 | Vasilik | 345/545 |
| 5,835,959 A | * | 11/1998 | McCool et al. | 711/171 |
| 6,175,900 B1 | * | 1/2001 | Forin et al. | 711/156 |
| 6,510,505 B1 | * | 1/2003 | Burns et al. | 711/170 |
| 6,658,619 B1 | * | 12/2003 | Chen | 714/748 |
| 6,874,062 B1 | * | 3/2005 | Goldberg | 711/117 |
| 2004/0156351 A1 | | 8/2004 | Kim | |

FOREIGN PATENT DOCUMENTS

| | | |
|---|---|---|
| JP | 2000-324161 A | 11/2000 |
| JP | 2003-179581 | 6/2003 |
| KR | 10-2002-0003232 A | 1/2002 |
| KR | 10-2002-0041851 A | 6/2002 |
| KR | 1020040042736 A | 5/2004 |
| KR | 1020040048288 A | 6/2004 |
| KR | 10-2005-0091581 A | 9/2005 |
| KR | 10-2006-0015198 A | 2/2006 |

* cited by examiner

*Primary Examiner*—David Ton
(74) *Attorney, Agent, or Firm*—Harness, Dickey & Pierce, P.L.C.

(57) ABSTRACT

A bitmap manager, a method of allocating a bitmap memory, a method of generating an acknowledgement between network entities, and a network entity implementing the same. The bitmap manager may include a bitmap memory for storing a block acknowledge of received frames based on a bitmap, a bitmap management information controller for receiving a bitmap entry number and storing bitmap management information associated with the physical address of the bitmap memory, and a bitmap manager finite state machine (BM FSM), receiving an update or an extract request for the received frames, managing the bitmap management information, and updating or extracting the bitmap memory.

15 Claims, 10 Drawing Sheets

Fig. 4A

| Frame Type | | Originator | |
|---|---|---|---|
| | | Immediate BA | Delayed BA |
| ADD_BA Req. | TX | Device driver (DD) adds BA Entry and then send ADD_BA_Req. Block ACK Policy may be set separately according to each policy. | |
| | RX | | |
| ADD_BA Res. | TX | | |
| | RX | If establishing is finished, ImmediateBA may be set. | If establishing is finished, ImmediateBA is not set. |
| QData | TX | Transmit ACK Policy as Block ACK. | |
| | RX | | |
| BAR | TX | Because ImmediateBA is 1, timer is set to BA Size. | Because ImmediateBA is 0, timer is set to ACK Size. |
| | RX | | |
| BA | TX | | |
| | RX | HW transfers BA to upper layer and does not answer ACK. | HW transfers BA to upper layer and answers ACK. |
| DELETE_ BA Req. | TX | DD erases the corresponding BA Entry for service complete or inactivity timeout and sends DELETE_BA_Req. | |
| | RX | DD erases the corresponding BA Entry | |

Fig. 4B

| Frame Type | | Recipient | |
| --- | --- | --- | --- |
| | | Immediate BA | Delayed BA |
| ADD_BA Req. | TX | | |
| | RX | In the course of establishing communication, DD adds BA Entry and then setups each hardware Bitmap. | In the course of establishing communication, DD adds BA Entry. |
| ADD_BA Res. | TX | Sending ADD_BA_Res. | |
| | RX | | |
| QData | TX | | |
| | RX | HW updates the corresponding Bitmap memory bits. | HW updates the corresponding Bitmap memory bits. |
| BAR | TX | | |
| | RX | HW extracts the corresponding Bitmap memory bits, makes BA, and sends BA. | HW transfers the BAR to DD and sends ACK. |
| BA | TX | If receiving BAR, HW transmits BA after SIFS time. | DD transmits BA when DD prepares BA. |
| | RX | | |
| DELETE_ BA Req. | TX | DD erases the corresponding BA Entry for inactivity timeout and sends DELETE_BA_Req. | |
| | RX | DD erases the corresponding BA Entry and markes the corresponding HW Bitmap invalid | DD erases the corresponding BA Entry |

BITMAP MANAGER, METHOD OF ALLOCATING A BITMAP MEMORY, METHOD OF GENERATING AN ACKNOWLEDGEMENT BETWEEN NETWORK ENTITIES, AND NETWORK ENTITY IMPLEMENTING THE SAME

PRIORITY STATEMENT

This non-provisional application claims priority under 35 U.S.C. § 119 of Korean Patent Application No. P2005-12293, filed on Feb. 15, 2005, the entire contents of which are incorporated by reference.

BACKGROUND OF THE INVENTION

In communication protocols, ARQ (automatic repeat request) is a conventional technique for detecting a frame error by a transmitter and requesting a repeat transmit if a frame has an error. There are several kinds of ARQ techniques such as stop-and-wait ARQ, go-back-n ARQ and selective repeat ARQ.

A stop and wait protocol transmits a Protocol Data Unit (PDU) of information and then waits for a response. The receiver receives each PDU and sends an Acknowledgement (ACK) PDU if a data PDU is received correctly, and a Negative Acknowledgement (NACK) PDU if the data was not received. In practice, the receiver may not be able to reliably identify whether a PDU has been received, and the transmitter will usually also need to implement a timer to recover from the condition where the receiver does not respond. Stop and Wait transmission is the simplest technique and is inadequate for high band width or high quality of service communications protocol.

A go-back-n ARQ protocol transmits numbered protocol data units of information up to the time of receiving a control PDU to indicate a missing PDU. If a sender receives the control PDU, it starts all the successive frames after the last successfully received frame. The go-back-n ARQ protocol has a problem of requiring a large buffer and a repetitive transmission of the same frames on receiving an error frame.

In a selective ARQ protocol, a sender retransmits selectively only the frame which had an error on transmission. The selective ARQ protocol has features to apply to a communication of high bandwidth or high quality of service. Wireless networks based on IEEE 802.11, for example, have been widely used by home and businesses. New applications such as video and multimedia streaming bring a new feature of quality of service (QoS) requirements to wireless network.

The increasing demand for bandwidth or quality of service (QoS) has caused network congestion, and more users request multimedia distribution to work without stops or slowdowns. These requirements are the reason for the development of a QoS enhancement scheme for the 802.11 Wireless LAN.

The legacy 802.11 MAC always sends an acknowledgement (ACK) frame after each frame that is successfully received. Block ACK allows several data frames to be transmitted before an ACK is returned, which increases the efficiency since every frame has a significant overhead for radio synchronization. Block acknowledgements increase efficiency by aggregating the ACKs for multiple received frames into a single response. Block ACK is initiated through a setup and negotiation process between the QSTA (QoS station) and QAP (QoS access point). Once the block ACK has been established, multiple QoS Data frames can be transmitted in a contention free burst, with SIFS (short inter frame space) separation between the frames.

There are two block ACK mechanisms defined under 802.11e: immediate and delayed. When using immediate block ACK, the originator transmits multiple data frames in a contention free burst, separated by SIFS. The originator must obey the constraints of the TXOP (transmission opportunity) duration it is currently operating within. At the end of the burst, the originator transmits a block ACK Request frame. The recipient must immediately respond with a block ACK frame containing the acknowledgement status for the previous burst of data frames.

The delayed policy allows the group acknowledgement to be sent in a subsequent TXOP following the burst. The same sequence of a contention free burst and block ACK request is used as in the immediate mechanism. The recipient simply sends a standard ACK in response to the block ACK request, indicating that the block ACK will be delayed. Delayed acknowledgement increases the latency, and is provided to support lower performance implementations that are unable to immediately calculate the ACK.

SUMMARY OF THE INVENTION

Example embodiments of the present invention are directed to a bitmap manager, method of allocating a bitmap memory, method of generating an acknowledgement between network entities, and a network entity implementing the same.

Example embodiments of the present invention are directed to a bitmap manager, method of allocating a bitmap memory, method of generating an acknowledgement between network entities, and a network entity implementing the same, which implement an improved block ACK technique.

Example embodiments of the present invention may also be applied to selective ACK protocols.

Example embodiments of the present invention are directed to more flexible and dynamic technique for managing and/or allocating a bitmap memory.

Example embodiments of the present invention are directed to a network entity including an automatic repeat request finite state machine (ARQ FSM) receiving frames from another network entity, decoding selective information from the received frames, returning a block acknowledgement or an acknowledgement frame to the other network entity, an ARQ information comparator, comparing the selective information of received frame with stored entry information, and deciding an acknowledgement policy, and a bitmap manager, storing block acknowledge bits and bitmap management information according to the acknowledgement policy.

In example embodiments, the ARQ information comparator includes a MAC address (MA) comparator, wherein the MAC address (MA) comparator is based on a key search engine (KSE) for secure wireless communication.

In example embodiments, the ARQ information comparator further includes a MAC address (MA) comparator searching a MAC address entry number (MA_EN) of a MAC address matched with the MAC address of the received frame and a MAC address entry number and traffic ID (MA_EN/TID) comparator searching a bitmap entry number (Bt-M_EN) of a bitmap management information (BMI) matched with the MAC address entry number (MA_EN) and traffic ID (TID) from the MAC address comparator.

In example embodiments, the ARQ information comparator is based on a key search engine.

In example embodiments, the bitmap management information includes start waiting flag (SWF) and a start sequence number (SSN).

In example embodiments, a bitmap management information controller sets a start waiting flag (SWF) at each start of a block acknowledge (BA) transaction and clears the start waiting flag (SWF) at each end of the block acknowledge (BA) transaction.

In example embodiments, the bitmap FSM controls to update entries in the bitmap management controller, and controls to update or extract the acknowledge information from the bitmap memory for received frames.

In example embodiments, the bitmap management information controller calculates an actual address in the bitmap memory.

In example embodiments, the bitmap management information controller defragments the bitmap memory by allocating a currently used bitmap portion into an unused bitmap portion of the bit map memory.

In example embodiments, the bitmap management information controller allocates a currently used bitmap portion into an unused bitmap portion by modifying start memory addresses of each portion of the bitmap memory allocated to acknowledge information for receiving frames.

In example embodiments, the bitmap FSM sets the start waiting flag at each start of a block acknowledge (BA) transaction and clears the start waiting flag at each end of the block acknowledge (BA) transaction.

In example embodiments, the bitmap manager includes a memory for storing the block acknowledge bits based on a bitmap.

In example embodiments, the ARQ information comparator includes a MAC address (MA) comparator, wherein the MAC address (MA) comparator is based on a key search engine (KSE) for secure wireless communication.

In example embodiments, the selective information of the received frame includes a MAC address (MA) or traffic ID (TID).

In example embodiments, at least one traffic ID (TID) corresponds to a MAC address (MA).

In example embodiments, the number of TIDs is up to the maximum number of stations.

In example embodiments, the ARQ information comparator further includes a MAC address (MA) comparator searching a MAC address entry number (MA_EN) of a MAC address matched with the MAC address of the received frame and a MAC address entry number and traffic ID (MA_EN/TID) comparator searching a bitmap entry number (BtM_EN) of a bitmap management information (BMI) matched with the MAC address entry number (MA_EN) and traffic ID (TID) from the MAC address comparator.

In example embodiments, the MAC address entry and traffic ID comparator searches the bitmap entry number (BtM_EN) of a bitmap management information upon the hit of the MAC address entry number (MA_EN).

In example embodiments, the MAC address entry number and traffic ID (MA_EN/TID) comparator generates a block acknowledge frame at the hit of searching the bitmap entry number (BtM_EN) of a bitmap management information (BMI) matched with the MAC address entry number (MA_EN) and traffic ID (TID) from the MAC address comparator.

In example embodiments, the automatic repeat request finite state machine (ARQ FSM) generates an acknowledge frame at the miss of searching the bitmap entry number (BtM_EN) of a bitmap management information (BMI) matched with the MAC address entry number (MA_EN) or traffic ID (TID) from the MAC address comparator.

In example embodiments, the automatic repeat request finite state machine (ARQ FSM) generates a block acknowledge frame with a delay by software at the miss of searching the bitmap entry number (BtM_EN) of a bitmap management information (BMI) matched with the MAC address entry number (MA_EN) or traffic ID (TID) from the MAC address comparator.

In example embodiments, the automatic repeat request finite state machine (ARQ FSM) ignores a received block acknowledge frame when the ARQ FSM is not in the state of waiting for the block acknowledge frame after sending a block acknowledge request.

In example embodiments, the automatic repeat request finite state machine (ARQ FSM) generates a search request to the ARQ information comparator to compare the selective information of the received frame with the entries of the ARQ information comparator.

In example embodiments, the automatic repeat request finite state machine (ARQ FSM) generates an update request to the bitmap manager (BM) to update the bitmap memory and the bitmap management information if the ARQ information comparator generates a hit signal.

In example embodiments, the network entity is at least one of station (STA) or an access point (AP) connected to a wireless network.

In example embodiments, the wireless network supports communication between the stations and communication between the station and the access point.

Example embodiments of the present invention are directed to a block ACK (BA) support method between an originator and a recipient, each of which may be operating with an immediate block ACK or delayed block ACK policy. In example embodiments, each of the originator or the recipient may have a hierarchy of hardware, device driver, and software components, the software component being the most flexible.

Example embodiments of the present invention are directed to a method of allocating a bitmap memory of a first network entity, including negotiating a type of block acknowledgement with a second network entity, including an immediate block acknowledgement or a delayed block acknowledgement, negotiating an amount of data to be transferred, and changing the bitmap entry or acknowledge information of the first network entity to the second network entity based on the amount of data to be transferred and the type of block acknowledgement.

In example embodiments, the first network entity includes software, a device driver and hardware, and wherein the first network entity is an originator and the second network entity is a recipient, the device driver of the first network entity sending a block acknowledgement request to the second network entity, the hardware of the first network entity receiving an immediate block acknowledgement from the second network entity, the first network entity setting a timer based on the immediate block acknowledgement, the hardware of the first network entity receiving a block acknowledgement and transferring the block acknowledgement to the device driver and the software, and the device driver of the first network entity erasing a block acknowledgement and deleting the block acknowledgement request.

In example embodiments, the first network entity includes software, a device driver and hardware, and wherein the first network entity is an originator and the second network entity is a recipient, the device driver of the first network entity sending a block acknowledgement request to the second network entity, the hardware of the first network entity receiving a delayed block acknowledgement from the second network entity, the first network entity setting a timer based on the delayed block acknowledgement, the hardware of the first network entity receiving a block acknowledgement, transferring the block acknowledgement to the device driver and the software, and answering the block acknowledgement, and the device driver of the first network entity erasing a block acknowledgement and deleting the block acknowledgement request.

In example embodiments, the first network entity includes software, a device driver and hardware, and wherein the first network entity is a recipient and the second network entity is an originator, the device driver of the first network entity adds a block acknowledgement information to the bitmap memory and dynamically allocates a portion of the bitmap memory, the first network entity sending a block acknowledgement response to the second network entity, the hardware of the first network entity updates the portion of the bitmap memory, the hardware of the first network entity extracts corresponding bits from the bitmap memory, creates the block acknowledgement, and transmits the block acknowledgement to the second network entity, if the first network entity receives a block acknowledgement request, the hardware of the first network entity transmitting the block acknowledgement, and the device driver of the first network entity erasing the block acknowledgement and deleting the block acknowledgement request.

In example embodiments, the first network entity includes software, a device driver and hardware, and wherein the first network entity is a recipient and the second network entity is an originator, the device driver of the first network entity adds a block acknowledgement information to the bitmap memory and dynamically allocates a portion of the bitmap memory, the first network entity sending a block acknowledgement response to the second network entity, the software of the first network entity extracts corresponding bits from the bitmap memory, creates the block acknowledgement, and transmits the block acknowledgement to the second network entity, the hardware of the first network entity transfers the block acknowledgement request the device driver of the first network entity and the hardware of the first network entity transmits an acknowledgement, and the device driver of the first network entity prepares and sends the block acknowledgement, the device driver of the first network entity erasing the block acknowledgement and deleting the block acknowledgement request.

Example embodiments of the present invention assign various tasks to hardware, device driver, and software components to increase the flexibility of the resulting entity or method.

Example embodiments of the present invention are directed to a method of generating an acknowledge between network entities including searching stored selective information matched with the selective information from received frames, generating a hit/miss signal, and deciding a type of the block acknowledge, updating bitmap management information and a bitmap memory on the hit of the selective information, and generating a block acknowledge or an acknowledge frame from the bitmap memory according to the bitmap management information.

In example embodiments, the acknowledge bits are stored based on a bitmap type, indicating one acknowledge bit per one received frame.

In example embodiments, the type of acknowledge to the received frame is decided by the key search engine (KSE) for security of wireless communication.

In example embodiments, the selective information includes a MAC address (MA) or traffic ID (TID).

In example embodiments, at least one traffic ID (TID) corresponds to a MAC address (MA).

In example embodiments, the number of TIDs is up to the maximum number of stations.

In example embodiments, deciding the type of the block acknowledge further includes searching a MAC address entry number (MA_EN) matched with a MAC address (MA) of the received frame and generating a hit/miss signal of the search of the MAC address entry number (MA_EN) and searching a bitmap entry number (BtM_EN) matched with a MAC address entry and number traffic ID (MA_EN/TID) at the hit of the MAC address entry number (MA_EN) and generating a hit/miss signal of the search of the bitmap entry number (BtM_EN).

In example embodiments, the method further includes generating a block acknowledge frame at the hit of searching the bitmap entry number (BtM_EN) of a bitmap management information (BMI) matched with the MAC address entry number (MA_EN) and traffic ID(TID) from the MAC address comparator.

In example embodiments, the method further includes generating an acknowledge frame at the miss of searching the bitmap entry number (BtM_EN) of a bitmap management information (BMI) matched with the MAC address entry number (MA_EN) or traffic ID(TID) from the MAC address comparator.

In example embodiments, the method further includes generating a block acknowledge frame with a delay by software at the miss of searching the bitmap entry number (BtM_EN) of a bitmap management information (BMI) matched with the MAC address entry number (MA_EN) or traffic ID(TID) from the MAC address comparator.

In example embodiments, the method further includes storing the selective information in a MAC address comparator or a MAC address entry and traffic ID comparator when the network entity receives an acknowledge policy frame.

In example embodiments, the method further includes storing the bitmap management information in a bitmap management information controller and block acknowledge bits in the bitmap memory.

In example embodiments, storing the bitmap management information and block acknowledge bits includes controlling a search, an update, and an extract operation of the bitmap management information and block acknowledge bits.

In example embodiments, the bitmap management information includes a number of negotiated protocol data units (NOP), a start address of the bitmap memory (SMA), and a number of fragments of the protocol data unit.

In example embodiments, a bitmap management information controller calculates a start address of the bitmap memory (SMA) by a number of fragments of protocol data units (NOF) and a number of protocol data units (NOP).

In example embodiments, the bitmap memory moves a remaining block acknowledge portion to an empty portion with a lower address than the remaining block acknowledge portion after transferring a block acknowledge frame or one ACK frame in response to a received block acknowledge request (BAR) frame.

In example embodiments, software manages a change of position for the remaining block acknowledge portion.

In example embodiments, a bitmap management information controller modifies a start address in the bitmap memory in accordance with a change of the start address of a moved bitmap memory portion.

In example embodiments, an update or extract of the bitmap management information or the bitmap memory is executed in every block acknowledge (BA) transaction.

In example embodiments, a bitmap management information controller includes a start waiting flag (SWF) and a start sequence number (SSN).

In example embodiments, a bitmap management information controller sets a start waiting flag (SWF) at each start of a block acknowledge (BA) transaction and clears the start waiting flag (SWF) at each end of the block acknowledge (BA) transaction.

In example embodiments, an automatic repeat request finite state machine (ARQ FSM) ignores a received block acknowledge frame when the ARQ FSM is not in the state of waiting for the block acknowledge frame after sending a block acknowledge request.

In example embodiments, one of the network entities is at least one of station (STA) or an access point (AP) connected to a wireless network.

In example embodiments, the wireless network supports communication between the stations and communication between the station and the access point.

Example embodiments of the present invention are directed to a bitmap manager, method of managing a bitmap memory, and a network entity implementing the same which comply with the IEEE 802.11 e or 801.16 d wireless network standards.

BRIEF DESCRIPTION OF THE DRAWINGS

The present invention will become more fully understood from the detailed description given below and the accompanying drawings, which are given for purposes of illustration only, and thus do not limit the invention.

FIG. 4a and FIG. 4b illustrate a block ACK (BA) support method in accordance with an example embodiment in the present invention.

It should be noted that these Figures are intended to illustrate the general characteristics of methods and devices of example embodiments of this invention, for the purpose of the description of such example embodiments herein. These drawings are not, however, to scale and may not precisely reflect the characteristics of any given embodiment, and should not be interpreted as defining or limiting the range of values or properties of example embodiments within the scope of this invention.

DETAILED DESCRIPTIONS OF EXAMPLE EMBODIMENTS

Figure 1:
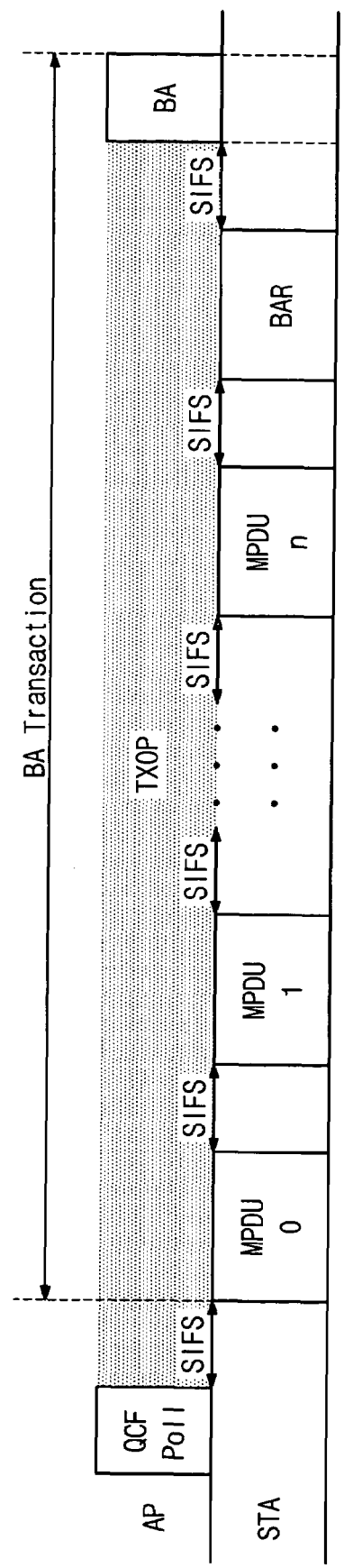
FIG. 1 illustrates an example of the timing requirements in a related art block ACK request in accordance with an example embodiment of the present invention.

FIG. 1 illustrates an example of the timing requirements in a related art block ACK request in accordance with an example embodiment of the present invention. FIG. 1 shows the point-to-point connection between a station (STA) and an access point (AP). The STA and the AP shown in the FIG. 1 are a QoS station (QSTA) and a QoS access point (QAP) supporting the 802.11 e standard. In particular, FIG. 1 illustrates the timing requirements of a block ACK Request between an access point (AP) and a station (STA) for a transmit opportunity (TXOP).

As shown in FIG. 1, after a QoS contention free (QCf) poll, the STA receives a TXOP and commences data transmission within a short inter-frame space (SIFS). The block ACK (BA) transaction may begin with the transmission of one or more MAC protocol data units (MPDUs), from the AP to the STA. Each MPDU is separated by an SIFS. At the end of the string of MPDUs, the STA receives a block ACK request (BAR) followed by another SIFS. As shown in FIG. 1, the STA responds to the BAR from the AP with a block ACK (BA) which is 128 bytes.

In the 802.11e standard, if the STA receives a block ACK request (BAR) frame, the STA must complete the ARQ negotiation with the AP, by supplying either an immediate ACK or a delayed ACK, in a SIFS time period. The STA will return a BA or one ACK, depending on a result of acknowledge policy negotiation.

With respect to frames received by the STA, an ARQ engine is used to store the state of ACK/NAKs in a bitmap memory. If a BA is requested, the ARQ engine of the STA will send a BA after a SIFS period.

The bitmap memory of the ARQ engine of the STA stores the values of ACK/NAKs as "high" (ACK) and "low" (NACK). In an example embodiment, an ARQ engine employing such a bitmap memory is referred to as a bitmap based ARQ engine and is discussed in more detail below.

Factors for designing a bitmap-based ARQ engine include the number of stations (STA) in communication with an AP, a number of traffic IDs or TIDs (a maximum of 16 is set in the 802.11 e standard), a number of protocol data units (PDUS) in one BA frame (a maximum of 64 is set in the 802.11 e standard), and a number of fragments (a maximum of 16 is set in the 802.11 e standard).

Figure 2:
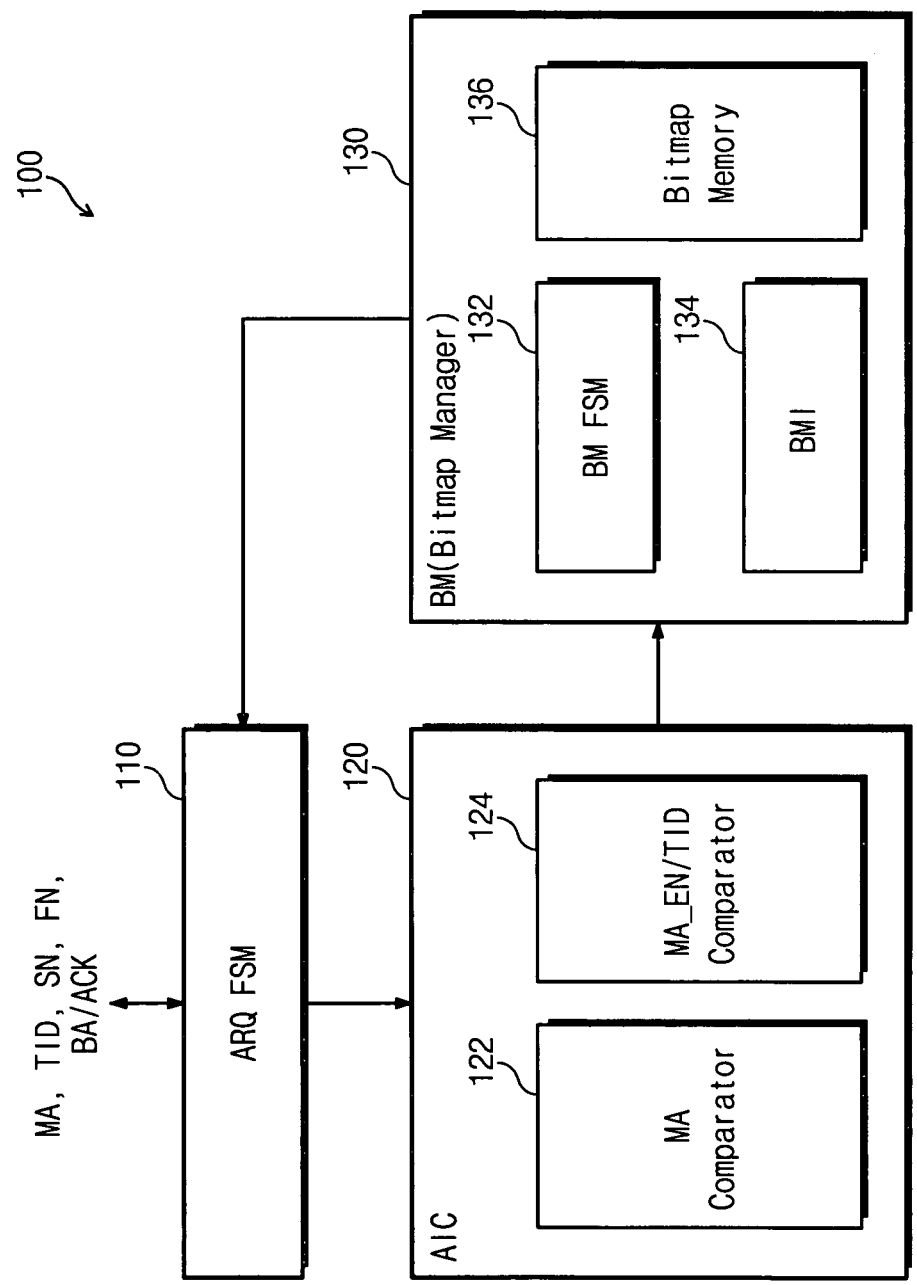
FIG. 2 illustrates a block diagram of a bitmap-based ARQ engine in accordance with an example embodiment of the present invention.

FIG. 2 illustrates a block diagram of a bitmap-based ARQ engine in accordance with an example embodiment of the present invention. As illustrated in FIG. 2, the bitmap-based ARQ engine 100 may include an ARQ finite state machine (FSM) 110, an ARQ information comparator (AIC) 120, and/or a bitmap manager (BM) 130.

In an example embodiment, the AIC 120 may include a MAC address (MA) comparator 122 and/or a MAC address entry number and traffic ID (MA_EN/TID) comparator 124.

In an example embodiment, the bitmap manager 130 may include a bitmap manager finite state machine (BM FSM) 132, a bitmap management information controller 134, and a bitmap memory 136.

In an example embodiment, the ARQ FSM 110 may exchange selective information, for example, MAC addresses, TIDs, sequence numbers, fragment numbers, and BA/ACK frames with a MAC controller. The ARQ FSM 110 may decode the received frames and control to search, update, and/or extract acknowledge information and return either a BA or an ACK.

The AIC 120 may receive a search request from the ARQ FSM 110 and generate a hit/miss signal and bitmap entry information by comparing MAC addresses (in an example, MAC addresses are 48 bits) and traffic IDs (TIDS). The AIC block 120 may be implemented with the same hardware used to implement a key search engine (KSE) in security function block, thereby saving hardware.

The bitmap manager (BM) 130 may update or extract the bitmap management information in accordance with the control from ARQ FSM 110. The bitmap manager 130 may includes a bitmap manager finite state machine (BM FSM) 132, a bitmap management information controller 134, and/ or a bitmap memory 136.

If the ARQ FSM 110 sends an update or an extract request to the bitmap manager finite state machine (BM FSM) 132, acknowledge information in the bitmap memory 136 may be updated, managed and/or extracted by the BM FSM 132. The operation of the BM 130 is described in more detail below.

Figure 3:
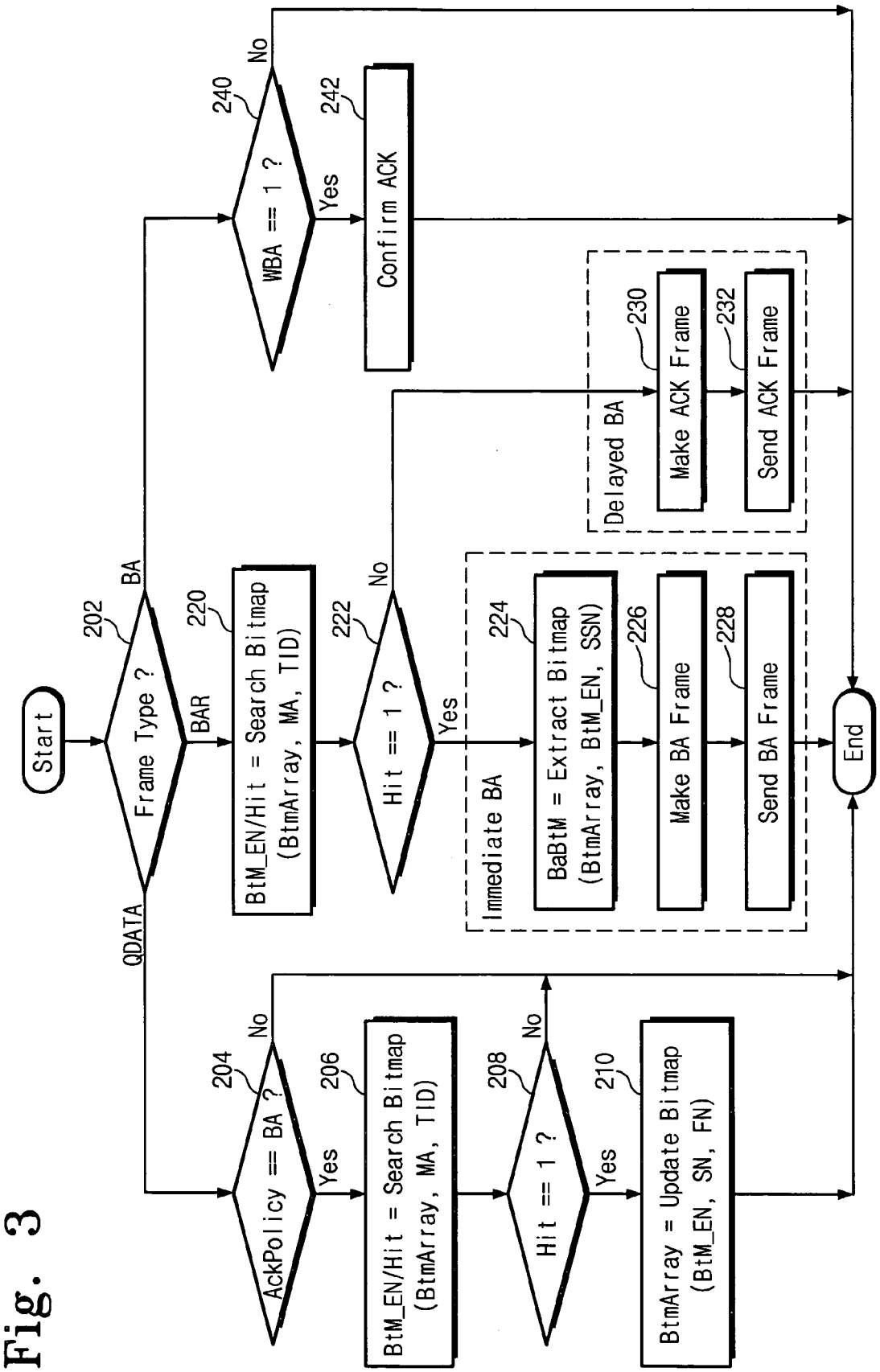
FIG. 3 illustrates an example flow chart of operation of an ARQ FSM in accordance with an example embodiment in the present invention.

FIG. 3 illustrates an example flow chart of operation of an ARQ FSM, in accordance with an example embodiment in the present invention. The bitmap based ARQ engine is included in a QoS access point (QAP) and a QoS station (QSTA). The operation of the flow chart between a originator and a recipient may be applied to the operation between a QoS AP and QoS STA and also between stations.

As shown in the FIG. 3, initially, the ARQ FSM 110 may determine the frame type, for example QoS data (QData), a block ACK request (BAR) or a block ACK (BA) at S202.

If the frame is a QData frame, the ARQ FSM 110 may determine whether the ACK policy is a block ACK (BA) policy at 204 from the selective information in the received frame field. If yes, the ARQ FSM 110 may send a search request (at S206) to the AIC 120 to determine whether an entry has a matching MAC address (MA) and traffic ID (TID) combination. If the received search request is a hit at S208, the bitmap memory 136 is updated corresponding to a new entry represented by a bitmap entry number (BTM_EN), a sequence number (SN), and a fragment number (FN) at S210.

As shown in FIG. 3, if the received frame has a block ACK policy at S204, an update operation may be completed by setting the bitmap memory 136 after checking a cyclic redundancy code (CRC) of the frame to decide an acknowledge bit to a received frame at S206. A new bitmap management information (BMI) may be created If the recipient receives a setup frame in advance of QoS data frames. (not shown in FIG. 3)

If the frame is a BAR frame, the ARQ FSM 110 may send a search request at S220 to the AIC 120 to determine whether an entry has a matching MAC address (MA) and traffic ID (TID) combination. If the entry indicates a hit at S222, the ARQ FSM 110 may extract at S224 the acknowledge information from the desired location, the bitmap memory 136 with BtM_EN and start sequence number (SSN), prepare a BA frame at S226, and send the BA frame for an immediate BA at S228.

If the entry indicates a miss at S222, the ARQ FSM 110 prepares an ACK frame for a delayed BA at S230 and sends the ACK frame at S232 and takes no action for making a BA frame. But, after sending the ACK frame by the ARQ FSM 110, the recipient prepares a BA frame by software.

At the frame type check step S202, if the frame is a block ACK frame, the ARQ FSM 110 determines whether the ARQ FSM 110 is waiting for a block ACK at S240. If yes, the ARQ FSM 110 confirms the ACK at S242. If the ARQ FSM 110 is not in a state of waiting for a block ACK frame at S240, the ARQ FSM 110 ignores the BA frame.

As set forth above, depending on a search result, the ARQ FSM 110 determines the negotiation as an immediate ACK or a delayed ACK.

If the negotiation is an immediate ACK, the ARQ FSM 110 performs an update or extract operation and if the negotiation is a delayed ACK, the ARQ FSM 110 transmits an ACK frame. The determination of immediate ACK or delayed ACK may be performed by the AIC or a KSE according to the result of the hit/miss information.

If the received frame is a BAR, a search operation may be performed by the AIC 120 to determine a hit or miss at S222. If the result of the search is a hit, an immediate ACK is selected and the corresponding bitmap memory data is extracted. The BA is prepared and sent by the ARQ FSM 110.

If the result of the search is a miss, a delayed ACK is selected and the ARQ FSM 110 sends an ACK frame. After the ARQ FSM 110 analyzes the BAR frame and prepares the BA, the ARQ FSM 110 sends the BA.

At the AP in FIG. 1, if the AP sends a BAR and the received frame is BA, the AP will confirm the ACK frame. But if the AP does not send a BAR and the received frame is BA, the AP will ignore the BA, as shown at S240.

FIG. 4*a* and FIG. 4*b* illustrate a block ACK (BA) support method in accordance with an example embodiment of the present invention. As illustrated, FIG. 4*a* and FIG. 4*b* are outlined by originator and recipient, respectively, each of which may be operating with an immediate block ACK or delayed block ACK policy. In an example embodiment, the frame types exchanged between the originator and the recipient may include an add block ACK request (ADD_BA_Req) and an add block ACK response (ADD_BA_Res), QData, a BAR, a BA, and a delete block ACK request (DELETE_BA_Req). Each of these frame types may be transmitted or received by the originator or the recipient, depending whether the originator or the recipient is operating under an immediate Block ACK policy or delayed Block ACK policy. Further, each of the originator or the recipient may have a hierarchy of hardware, device driver, and software components, the software component being the most flexible. Example embodiment of the present invention, described below, assign various tasks to the hardware, device driver, and software components to increase the flexibility of the resulting entity or method.

In an example embodiment, the device driver manages all acknowledge information and the bitmap array, and sends a BA based on the stored bitmap. But, if the negotiation for a received frame results in an immediate BA, the BA is completed by the ARQ engine. If the negotiation for a received frame results in a delayed BA, the device driver makes the BA frame and sends the BA by itself. FIG. 4*a* and FIG. 4*b* illustrate the actions by a originator or recipient in an example embodiment.

FIG. 4*a* and FIG. 4*b* show that an ADD_BA_Req frame and an ADD_BA_Res frame are used between an originator and a recipient at a setup step before QoS data frame transmission.

As shown in FIG. 4*a* and FIG. 4*b*, a device driver (DD) of the originator may add a BA entry and then send an ADD_BA_Req to the recipient. A Block ACK policy may be set separately according to each recipient's policy. An ADD_BA_Req frame may include a TID, a block ACK policy, a transmit buffer size, and/or a timeout value as setup parameters.

According to FIG. 4*a* and FIG. 4*b*, if the recipient of a ADD_BA_Req. frame is implementing an immediate BA policy, the device driver of the recipient may add a BA entry and then set up a bitmap. If the recipient is implementing a delayed BA policy, the device driver of the recipient may add a BA entry. Then, regardless of the block ACK policy, the recipient sends an ADD_BA_Res to the originator.

In response to the ADD_BA_Res, if the originator is implementing an immediate BA policy and if the establishing is finished ImmediateBA, which is a parameter to indicate a block ACK policy, may be set. In contrast, if the originator is implementing a delayed BA policy and if the establishing is finished, an ImmediateBA will not be set.

The originator may transmit its ACK policy as a block ACK to the recipient. In response, if the recipient is implementing an immediate block ACK BA policy, hardware at the recipient may be used to update the corresponding bitmap memory bits. If the recipient is implementing a delayed block ACK policy, software at the recipient may be used to update to corresponding bitmap memory bits.

For the block ACK request, if the originator is implementing an immediate block ACK policy, because ImmediateBA is set, a timer is set to the block ACK size. If the originator is implementing a delayed block ACK policy, the timer is set to the ACK size.

In response, if a recipient is implementing an immediate block ACK policy, the recipient hardware extracts the corresponding bitmap memory bits, prepares a block ACK and sends the block ACK. If the recipient is implementing a delayed block ACK policy, the recipient hardware transfers the BAR to the device driver which sends the ACK.

If the recipient is implementing an immediate block ACK policy, once receiving the BAR, hardware at the recipient transmits the block ACK after SIFS. If the recipient is implementing a delayed block ACK policy, the device driver transmits the BA when ready.

In response, if the originator is implementing an immediate block ACK policy, hardware at the originator transfers the block ACK to an upper layer, for example, the device driver, and does not answer the ACK. If the originator is implementing a delayed block ACK policy, hardware at the originator transfers the block ACK to an upper layer and answers the ACK.

Once service is complete or an inactivity time-out expires, the device driver at the originator erases the corresponding BA entry and sends a DELETE_BA_Req to the recipient. In response, the device driver at the recipient erases the corresponding BA entry and sends a DELETE_BA_Req, thereby terminating the block ACK support method.

If the originator receives a DELETE_BA_Req, the device driver at the originator erases the corresponding BA entry. In response, if the recipient is implementing an immediate block ACK policy, the device driver at the recipient erases the corresponding BA entry and makes the corresponding hardware bitmap invalid. If the recipient is implementing a delayed ACK policy, the device driver at the recipient erases the BA entry.

Figure 5:
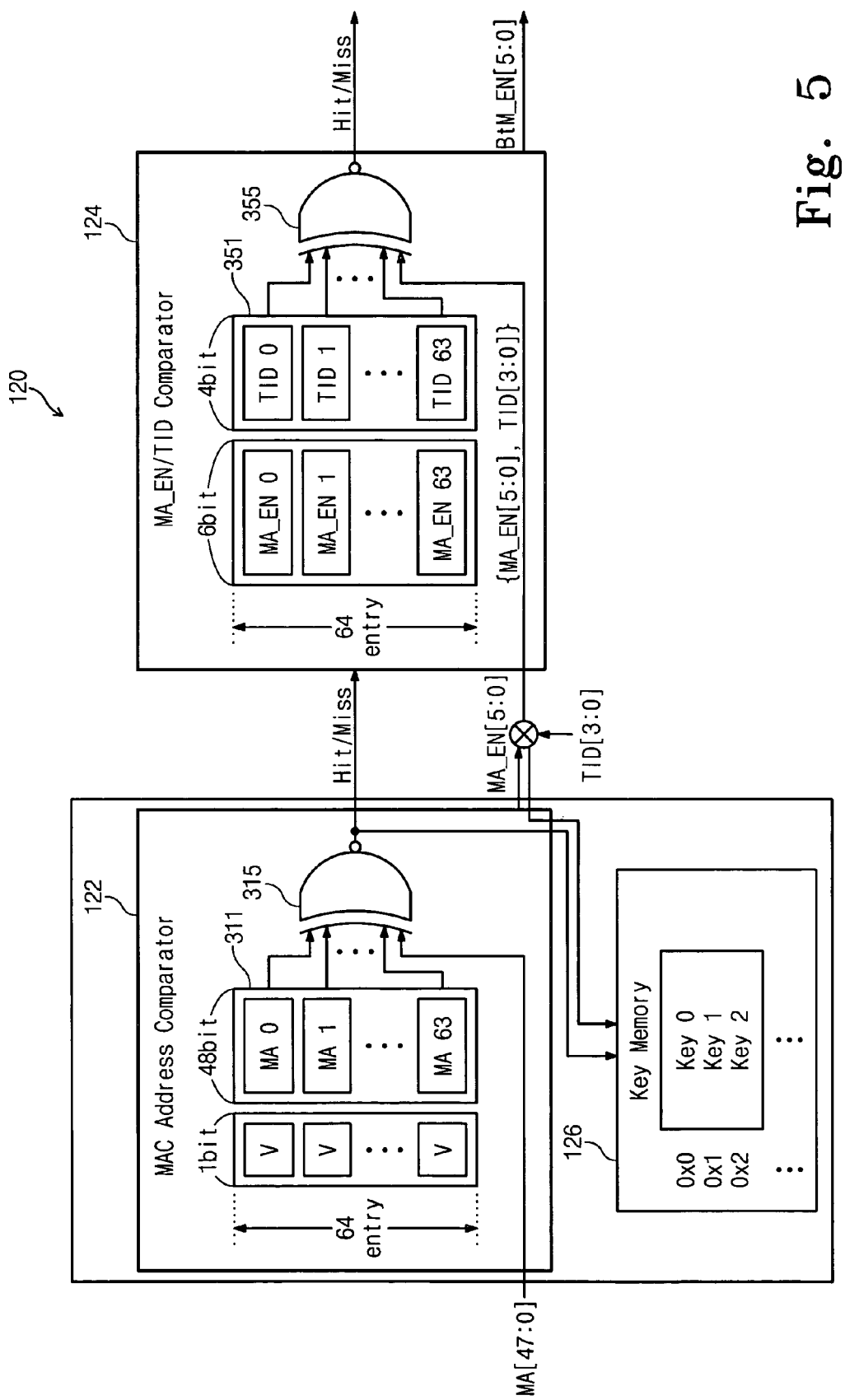
FIG. 5 illustrates an ARQ information comparator (AIC) in accordance with an example embodiment of the present invention.

FIG. 5 illustrates an ARQ information comparator (AIC) in accordance with an example embodiment of the present invention. As shown in FIG. 2 and also in FIG. 5, the AIC 120 may include a MAC address (MA) comparator 122 and/or a MAC address entry number and traffic ID (MA_EN/TID) comparator 124. In an example embodiment, the MAC address (MA) comparator 122 may be implemented as a conventional key search engine (KSE) for security, including a key memory 126, as shown in FIG. 5.

The MAC address (MA) comparator 122 may have a corresponding ARQ valid bit in accordance with each MAC address. The ARQ valid bit shows whether the corresponding MAC address has been negotiated as a block ACK. FIG. 5 illustrates a MAC address comparator implemented by entries of valid bits and MAC addresses 311, and a XNOR logic circuit 315.

The MAC address (MA) comparator 122 may receive a 48 bit MAC address, and determine whether that 48 bit MAC address corresponds to one of the entries (for example, one of 64 entries) in the MAC address (MA) comparator 122. As a result of the comparing of the MAC addresses, the MAC address (MA) comparator outputs a hit/miss signal and a MAC address entry number (MA_EN) to the MA_EN/TID comparator. If the MAC address corresponds to one of the entries, then the MAC address (MA) comparator 122 outputs a hit signal, the corresponding MA_EN, and TID signal to the MA_EN/TID comparator 124. If the MAC address comparator outputs a miss signal, the MA_EN/TID comparator ignores the MA_EN and a TID inputs and takes no further comparing of the input values of the MA_EN and the TID vaule with the MA_EN/TID value in the entries of the MA_EN/TID comparator 124. FIG. 5 also illustrates MA_EN/TID comparator implemented by entries of MA_EN bits and MAC addresses 351, and a XNOR logic circuit 355.

The MAC address (MA) comparator 122 may also output a hit/miss signal and an MA_EN signal, which is the entry number of the MAC address entries in the MA_EN/TID comparator 124. In the above example, the number of MAC address entry is 64 bits. The MA_EN signal may be concatenated with a TID signal, for example a four-bit TID signal (a maximum of $2^4$ or 16, set in the 802.11e standard) and supplied to the MA_EN/TID comparator 124.

The MA_EN/TID comparator 124 may include 64 entries, each including a 6 bit MA_EN and a 4 bit TID. If the concatenated MA_EN/TID signal that is supplied by the MA comparator 122 matches one of the entries in the MA_EN/TID comparator 124, a hit and a 6-bit bitmap entry number BtM_EN are output to the BM 130.

As set forth above, a KSE for security, for example, represented by the 802.11 i specification may be used as the AIC 120. Only valid ARQ and TID related information may be attached in an example embodiment of the present invention. Further, because the MAC address (MA) comparator and the MA_EN/TID comparator in the AIC 120 may be implemented to be a sequential comparators by using a single port SRAM instead of CAM (Content Addressable Memory) for the stored information, it is easier to implement, easier to verify prototype hardware by, for example, FPGA, and save area and/or cost.

In a conventional specification of 802.11 wireless communication, it is common to support 64 entries for key search engine (KSE). An example embodiment of the present invention shows that the AIC may support up to 64 stations for immediate BA, and it shows also that the AIC may support up to 16 TIDs for one entry and supports 64 TIDs totally. So, the ARQ engine may be configured to make each of 64 stations to have one TID or to make each 4 station to have 16 TIDs. In other words, the ARQ engine of the present invention has the flexibility to change configurations dynamically.

Figure 6:
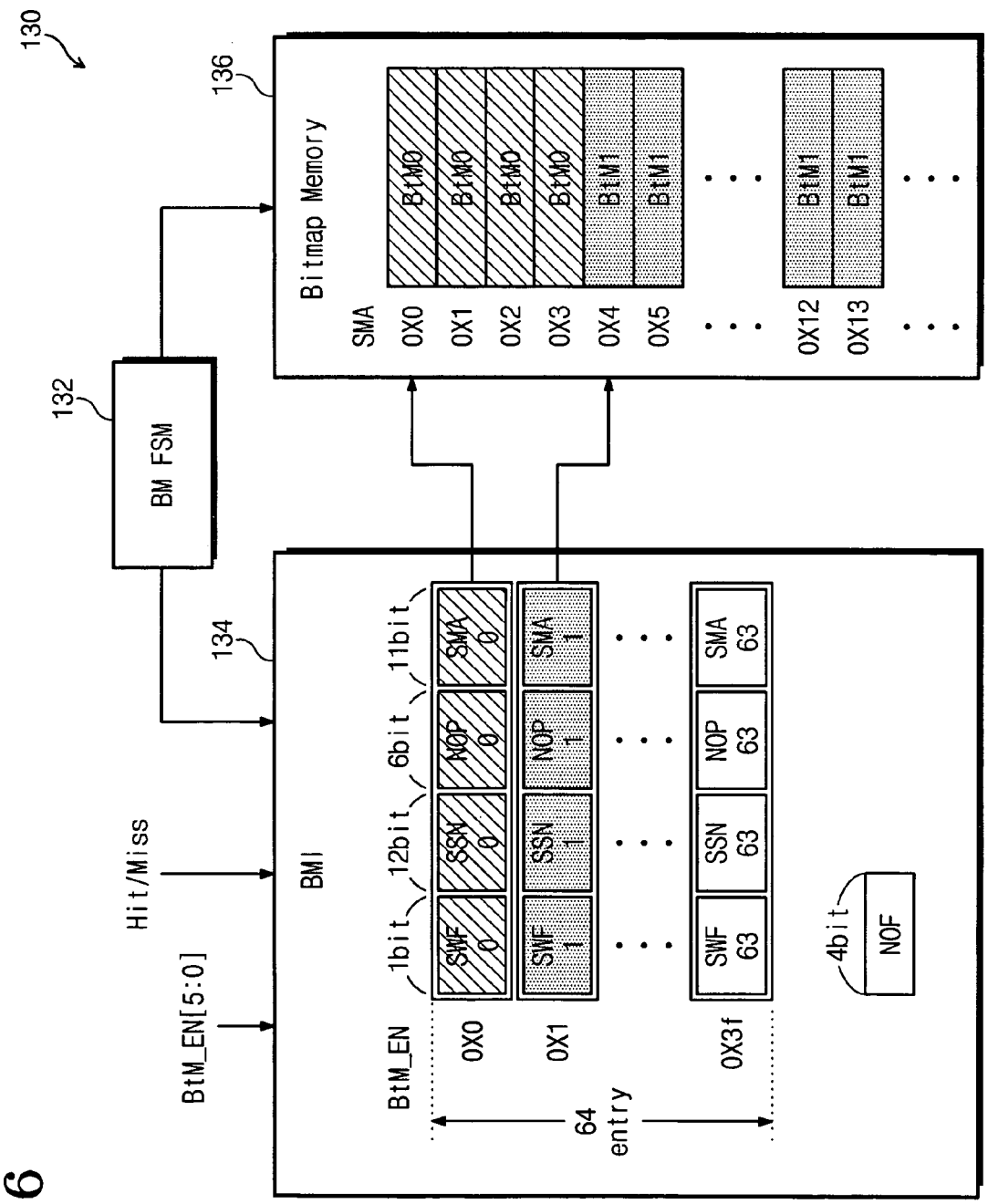
FIG. 6 illustrates a bitmap manager in accordance with an example embodiment of the present invention.

FIG. 6 illustrates a bitmap manager (BM) 130 in accordance with an example embodiment of the present invention. As illustrated in FIGS. 2 and 6, the BM 130 may include a bitmap manager finite state machine (BM FSM) 132, a bitmap management information controller 134, and a bitmap memory 136. The bitmap management information (BMI) controller 134 may receive the 6 bit bitmap entry number (BTM_EN) and a hit/miss signal from the AIC 120.

As shown in FIG. 6, the bitmap management information controller 134 may include a plurality of entries, for example, 64. Each of the entries may include a start waiting flag (SWF), represented by, for example, 1 bit, a start sequence number (SSN), represented by, for example, 12 bits, a number of PDU's field (NOP), represented by, for example, 6 bits, and a start memory address field (SMA), represented by, for example, 11 bits. The bitmap management information controller 134 may also include a number of fragments field (NOF), for example, of 4 bits. The start waiting flag (SWF) is a flag bit that indicates a start of new BA transaction. Each entry may have SWF, SSN, NOP, and SMA and may be stored in BMI controller 134. NOF is used to indicate the number of the current fragments of bitmap, for example, to indicate the usage of PDUs in the current network. NOF may be stored apart from the entry information, SWF, SSN, NOP, and SMA in BMI controller 134. NOP is used to indicate the maximum number of the negotiated PDUs. SMA indicates the physical address of the bitmap and may be calculated with NOF and NOP in BMI controller by an adder (not shown in FIG. 6) in the BMI controller.

In an example embodiment, the NOF, NOP, and SMA may be controlled by software and the SWF and SSN may be controlled by hardware.

If the bitmap management information (BMI) controller 134 receives a hit signal with a particular bitmap entry number, the BMI controller 134 calculates the real address in the bitmap memory with the bitmap management information as shown in FIG. 6.

The BM FSM 132 may carry out search, update, and/or extract operations based on a request from the ARQ FSM 110. The bitmap memory 136 may be used to store the Block ACK data information.

As shown in FIG. 6, the bitmap management information controller 134 may flexibly manage the bitmap memory 136 by recording the start memory address (SMA) of the bitmap memory 136. In an example embodiment, software may be used to record the number of fragments (NOF), the maximum negotiated number of PDUs (NOP), and the real start address (SMA) of the bitmap memory 136 using both the NOF and the NOP.

Figure 7:
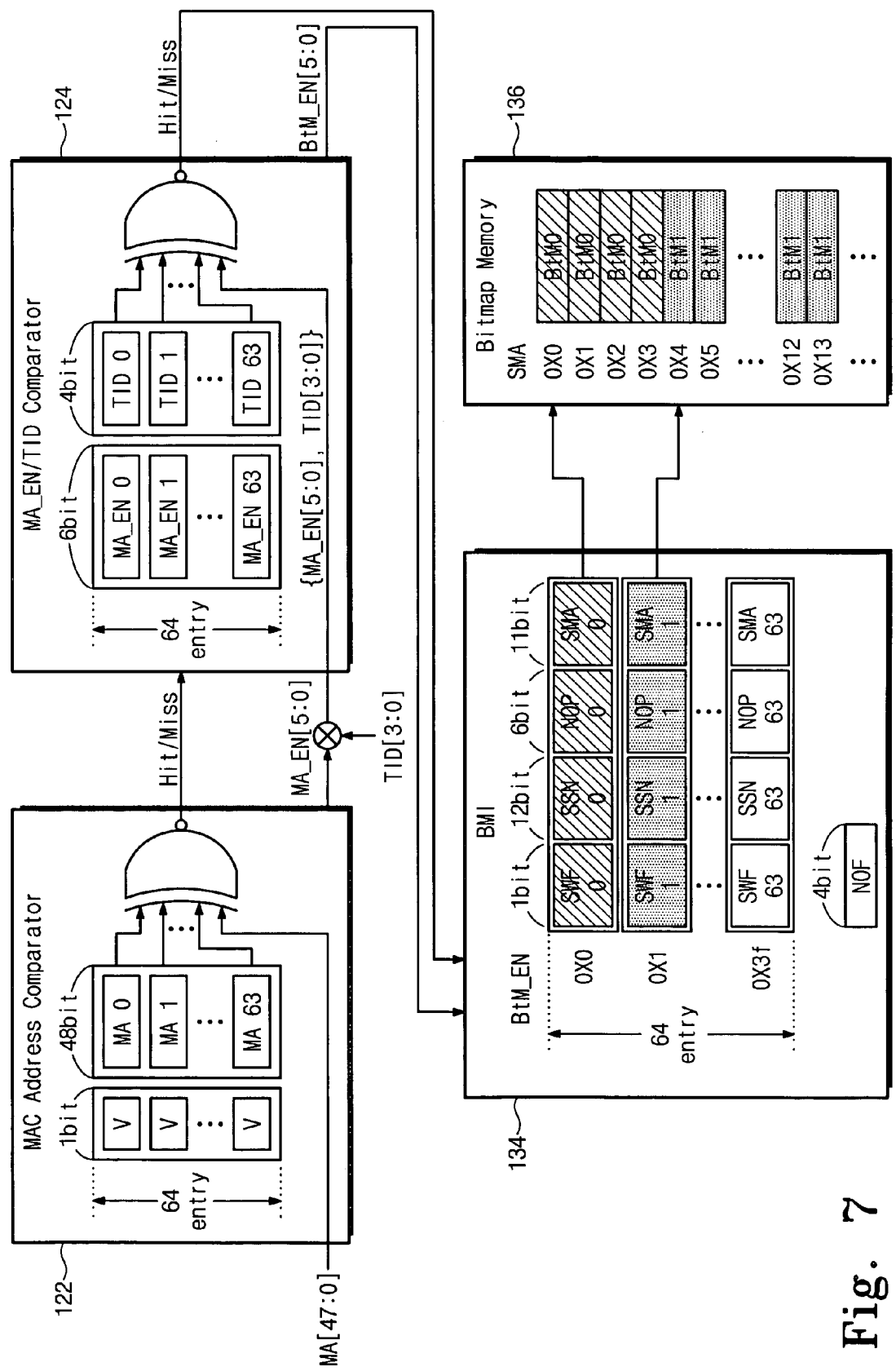
FIG. 7 illustrates the flexibility of a bitmap manager (BM) in accordance with an example embodiment of the present invention.

FIG. 7 illustrates the flexibility of a bitmap manager (BM), for example BM 130, in accordance with an example embodiment of the present invention, assuming NOF is 8.

As shown in FIG. 7, the first entry, 0×0 in bitmap management information controller 134 is negotiated as maximum 4 PDUs and the second entry, 0×1 in bitmap management information controller 134, is negotiated as maximum 16 PDUs. Hardware in the BM 130 may calculate the exact bitmap memory address for an search, update, and/or extract operation by using the SMA, NOF, NOP, SSN, and the sequence number (SN) and fragment number (FN) of the received frames.

In an example embodiment of the present invention, the bitmap management information controller 134 supports 64 entries, the same as the number of STAs, but the size of the bitmap memory is 2,048 bytes that are supporting 16 entries as the pair of 16 fragment and 64 PDUs.

In example embodiments of the present invention, a smaller bitmap memory 136, for example, 2,048 bytes, may be used but may be extended using fragment/PDU pairs as maximum of 16.

Figure 8:
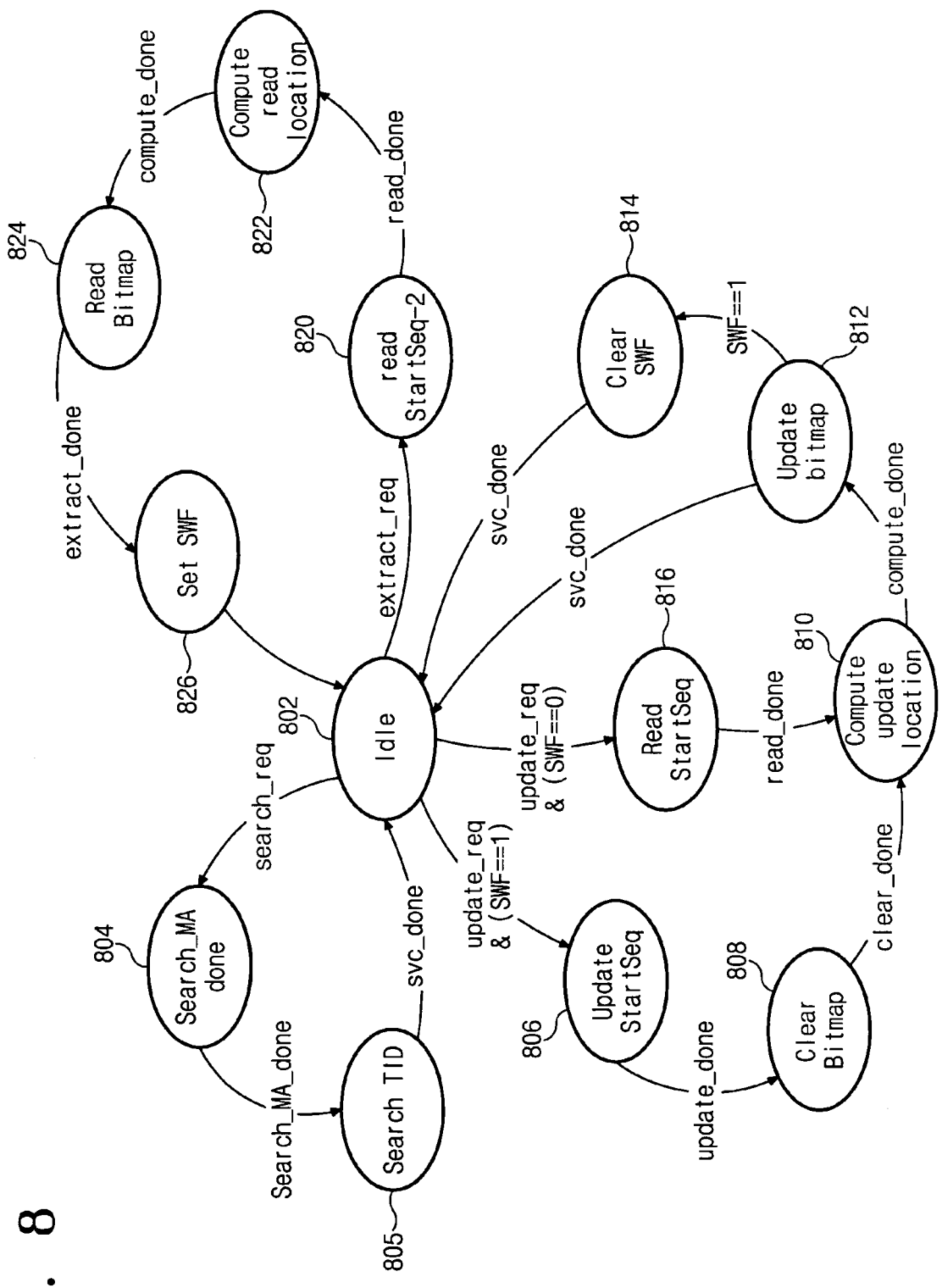
FIG. 8 illustrates a state diagram of a finite state machine (FSM) of a bitmap manager (BM) in accordance with an example embodiment of the present invention.

FIG. 8 illustrates a state diagram of a finite state machine (FSM) of a bitmap manager (BM), for example, the BM FSM 132 of FIGS. 2 and 5 in accordance with an example embodiment of the present invention.

In an example embodiment, the BM FSM 132 begins in an idle state 802. If the BM FSM 132 receives a search request (search_req), the BM FSM 132 transitions to state 804 (search_MA), and searchs the MAC address entries to find an entry matched with the MAC address of received frame. Once the BM FSM 132 receives a search_MA_done signal from the AIC 120, the BM FSM 132 transitions to state 806 (search_TID), searches through the TIDs, generates a svc_done signal and returns to the idle state 802.

If the BM FSM 132 receives an update request update_req and SWF=1, the BM FSM 132 transitions to state 806 (Update StartSeq) and updates the StartSeq. SWF=1 indicates that the ARQ engine is waiting for the first BA policy frame, and then the BM FSM updates the sequence control field including a fragment number and a start sequence number in the BMI controller when the ARQ engine receives the first BA policy frame. Once the update is complete, the BM FSM 132 transitions to state 808 and clears the bitmap memory 136. Because of the new BA policy frame, the bitmap manager (BM) needs to make a room for the new BA frame. Once the bitmap memory 136 is cleared, the BM FSM 132 transitions to state 810, computes the update location and transitions to state 812, and updates the bitmap memory 136. The BM FSM 132 then transitions to state 814, clears the SWF flag and returns to the idle state 802. Because a new BA transaction started with a new BA policy frame, the SWF flag bit is clear and goes to idle state to receive the next frames.

If the BM FSM 132 receives an update request update_req and SWF=0, the BM FSM 132 transitions to state 816 and reads the StartSeq. Once the read is complete, the BM FSM 132 transitions to state 810, computes the update location and transitions to state 812, and updates the bitmap memory 136. The BM FSM 132 then transitions to state 814, clears the SWF flag and return to the idle state 802. After a BA transaction starts, when the ARQ engine 100 receives next frames, the bitmap manager 130 reads the stored sequence information from BMI controller 134 to calculate the location of the destination address of the bitmap memory, and updates the bitmap memory according to the received frames. When the SWF flag bit is 0 for a BA transaction, the BMI controller 134 skips the Clear SWF operation.

If the BM FSM 132 receives an extract request extract_req, the BM FSM 132 transitions to state 820, and reads the StartSeq. Once the read is complete, the BM FSM 132 transitions to state 822, computes the read location and transitions to state 824, and reads the information from the computed location. The BM FSM 132 then transitions to state 826, sets the SWF flag to indicate the completion of the current BA transaction and return to the idle state 802.

Figure 9:
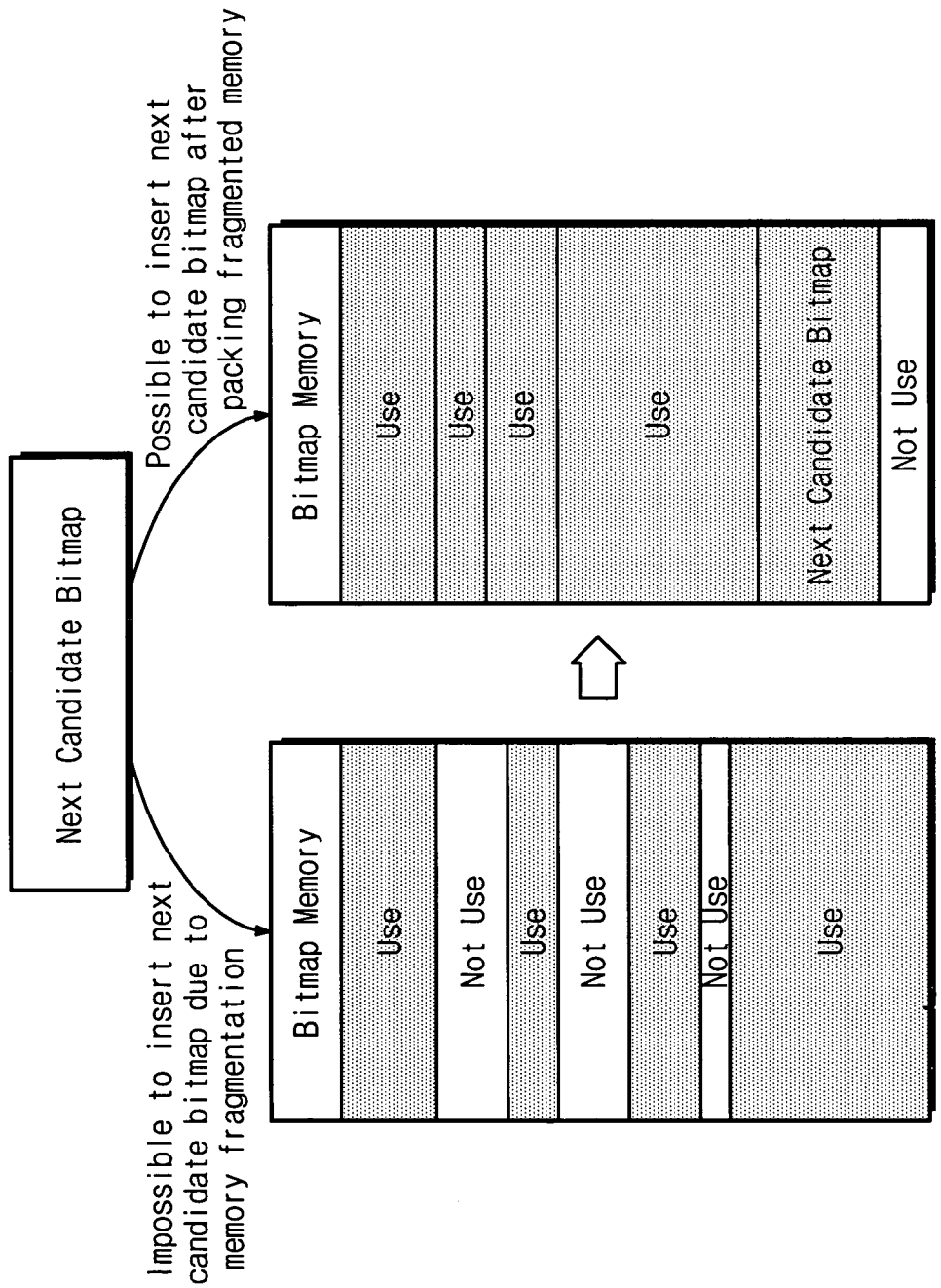
FIG. 9 illustrates memory packing in accordance with an example embodiment of the present invention.

FIG. 9 illustrates memory packing, for example, in the bitmap memory 136, in accordance with an example embodiment of the present invention. As shown in FIG. 9, a flexible memory arrangement may have a problem of memory fragmentation. The dynamic memory allocation makes memory fragments in the bitmap memory going through many BA transactions. Although, the total size of remaining memory portions in the bitmap memory 136 may be bigger than the size of a next candidate bitmap size, it is impossible to insert into the bitmap memory 136. If the ARQ engine has a larger memory for this memory fragmentation problem, the cost will increase.

As shown in FIG. 9, the BMI controller 134 solves this memory fragmentation by software. When the a BA transaction is finished, a remaining BA written memory portion is moved into a lower address of an unused portion by changing an SMA value of the remained BA transaction in the BMI controller 136 if the unused portion is bigger than the portion used by a remained BA transaction. With this memory packing scheme, the ARQ engine may use a smaller memory and reduce costs.

Example embodiments of the present invention provide effective block ACK methods of a bitmap-based ARQ engine 100. The ARQ engine 100 may use the key search engine (KSE) supporting the security specification of such as IEEE 802.11i, wireless LAN specification, and may negotiate BA policy for the received frame to response a immediate BA or a delayed BA in the SIFS period. The ARQ engine 130 may search the entries of information with a MAC address and a TID matched with a received frame and generate a hit/miss signal and an entry number for BA response.

The ARQ engine 100 also may search, update, and/or extract to manage bitmap management information, and response a BA request and flexible management of bitmap memory with SMA.

In example embodiments of the present invention, hardware may support an SIFS time limitation if the Immediate BA is negotiated. In example embodiments of the present invention, a flexible bitmap memory has an advantage of a lower gate count. In example embodiments of the present invention, gate count may further be reduced by using an existing KSE as the ARQ FSM, as discussed above.

Example embodiments of the present invention may be applicable to the 802.11 e standard or the 802.16 d standard. In the 802.16 d standard, a selective ACK method may be implemented by adjusting the ARQ FSM to the 802.16 d specification and by using connection ID (CID) instead of a MAC address, by fixing NOF as '1'.

It will be understood that, although the terms first, second, etc. may be used herein to describe various entities, these entities should not be limited by these terms. These terms are only used to distinguish one entity from another entity. Thus, a first entity recited below could be termed a second entity, without departing from the teachings of the present invention.

It will be apparent to those skilled in the art that other changes and modifications may be made in the above-described example embodiments without departing from the scope of the invention herein, and it is intended that all matter contained in the above description shall be interpreted in an illustrative and not a limiting sense.

What is claimed is:

1. A bitmap manager, comprising:
   a bitmap memory for storing a block acknowledge of received frames based on a bitmap;
   a bitmap management information controller for receiving a bitmap entry number and storing bitmap management information associated with the physical address of the bitmap memory; and
   a bitmap manager finite state machine (BM FSM), receiving an update or an extract request for the received frames, managing the bitmap management information, and updating or extracting the bitmap memory.

2. The bitmap manager of claim 1, wherein the bitmap management information includes a number of negotiated protocol data units (NOP), a start address of the bitmap memory (SMA), and a number of fragments (NOF) in each protocol data unit (PDU).

3. The bitmap manager of claim 1, wherein the bitmap management information controller calculates the start address of the bitmap memory (SMA) using a number of fragments of protocol data unit (NOF) and the number of negotiated protocol data units (NOP).

4. The bitmap manager of claim 1, wherein the bitmap memory moves a remaining block acknowledge portion to an empty portion with a lower address than the remaining block acknowledge portion after transferring a block acknowledge frame or one ACK frame in response to a received block acknowledge request (BAR) frame.

5. The bitmap memory of claim 4, wherein software manages a change of the position for the remaining block acknowledge portion.

6. The bitmap memory of claim 4, wherein the bitmap management information controller modifies the start address in the bitmap memory in accordance with the change of the start address of the moved bitmap memory portion.

7. The bitmap manager of claim 1, wherein the updating or extracting of the bitmap management information or the bitmap memory is executed in every block acknowledge (BA) transaction.

8. The bitmap manager of claim 1, the bitmap management information controller further including a start waiting flag (SWF) and a start sequence number (SSN).

9. The bitmap manager of claim 8, wherein the bitmap FSM sets the start waiting flag (SWF) at the start of each block acknowledge (BA) transaction and clears the start waiting flag (SWF) at the end of each block acknowledge (BA) transaction.

10. The bitmap manager of claim 1 wherein the received frames have a block acknowledgment policy.

11. A method of allocating a bitmap memory of a first network entity, comprising:
    negotiating a type of block acknowledgement with a second network entity, including an immediate block acknowledgement or a delayed block acknowledgement;
    negotiating an amount of data to be transferred; and
    changing the bitmap entry or acknowledge information of the first network entity to the second network entity based on the amount of data to be transferred and the type of block acknowledgement.

12. The method of claim 11, wherein the first network entity includes software, a device driver and hardware, and the first network entity is an originator and the second network entity is a recipient,
    the device driver of the first network entity sending a block acknowledgement request to the second network entity,
    the hardware of the first network entity receiving an immediate block acknowledgement or a delayed block acknowledge from the second network entity,
    the first network entity setting a timer based on the block acknowledgement policy,
    the hardware of the first network entity receiving a block acknowledgement and transferring the block acknowledgement to the device driver and the software, and
    the device driver of the first network entity erasing a block acknowledgement and deleting the block acknowledgement request.

13. The method of claim 11, wherein the first network entity includes software, a device driver and hardware, and wherein the first network entity is a recipient and the second network entity is an originator,
    the device driver of the first network entity adds a block acknowledgement entry or the acknowledge information and dynamically allocates a portion of the bitmap memory,
    the first network entity sending a block acknowledgement response to the second network entity,
    the hardware of the first network entity updates the portion of the bitmap memory,
    if the first network entity receives a block acknowledgement request, the hardware of the first network entity extracts corresponding bits from the bitmap memory, creates the block acknowledgement, and transmits the block acknowledgement to the second network entity, and
    the device driver of the first network entity erasing the block acknowledgement and deleting the block acknowledgement request.

14. A network entity, comprising:
an automatic repeat request finite state machine (ARQ FSM) receiving frames from another network entity, decoding selective information from the received frames, returning a block acknowledgement or an acknowledgement frame to the other network entity;
an ARQ information comparator, comparing the selective information of received frame with stored entry information, and deciding an acknowledgement policy; and
a bitmap manager, storing block acknowledge bits and bitmap management information according to the acknowledgement policy.

15. A method of generating an acknowledge between network entities comprising:
searching stored selective information matched with the selective information from received frames, generating a hit/miss signal, and deciding a type of the block acknowledge;
updating bitmap management information and a bitmap memory on the hit of the selective information; and
generating a block acknowledge or an acknowledge frame from the bitmap memory according to the bitmap management information.

* * * * *